United States Patent [19]

Judeinstein

[11] 4,168,108
[45] Sep. 18, 1979

[54] FIBER OPTIC CONNECTOR

[75] Inventor: André J. Judeinstein, Saint-Remy-les-Chevreuse, France

[73] Assignee: ITT Industries, Inc., New York, N.Y.

[21] Appl. No.: 882,443

[22] Filed: Mar. 1, 1978

[51] Int. Cl.² ............................................. G02B 5/16
[52] U.S. Cl. ............................... 350/96.22; 350/96.16
[58] Field of Search ............... 350/96.20, 96.21, 96.22, 350/96.16

[56] References Cited

U.S. PATENT DOCUMENTS

| 3,455,625 | 7/1969 | Brumley et al. | 350/96.22 |
| 3,910,678 | 10/1975 | McCartney et al. | 350/96.21 |
| 3,951,515 | 4/1976 | Allard | 350/96.22 |
| 4,015,894 | 4/1977 | Rocton | 350/96.21 |

Primary Examiner—Stewart J. Levy
Attorney, Agent, or Firm—Thomas L. Peterson

[57] ABSTRACT

A connecting device is disclosed for coupling an optical fiber cable to a cylindrical optical mixer. Cylindrical tubular ferrules are provided with watch jewels and adapted to receive either the mixer or optical fibers arranged in an annular array. Flanges and a spacer are used to achieve alignment of the two tubular ferrules and, hence, the mixer and fibers.

5 Claims, 8 Drawing Figures

FIBER OPTIC CONNECTOR

BACKGROUND OF THE INVENTION

This invention relates generally to a fiber optic connector and, more specifically, to a connecting device for coupling a fiber optic bundle and an optical mixing device such as a tubular mixer.

A mixer is known in the art which consists of a cylindrical tube, terminated at each end by a flat face perpendicular to the axis of the tube. The tube is made of a transparent material whose refractive index is greater than that of the media with which its inner and outer walls are in contact. The mixer may or may not be coated with a transparent material (glass or synthetic resin) which constitutes an optical sheathing. The properties of this mixer are such that, if it is of sufficient length, the light energy supplied by an incident beam at any point on the entrance face is distributed uniformly over the exit face.

The purpose of the present invention is to provide a connector to couple a fiber optic bundle to said mixer.

Fiber optic coupling arrangements pertinent to this invention are disclosed in U.S. Pat. Nos. 3,910,678; 3,971,383 and 4,015,894.

SUMMARY OF THE INVENTION

According to the principal aspect of the present invention, there is provided a detachable connecting device for coupling a fiber optic bundle and an optical mixing device. The connecting device includes a mixer support and a connector. The mixer support comprises a cylindrical body with a coupling flange and end piece at each end thereof. An axial bore extends to the ends of the body. A counter bore is provided at each of the two ends. A ring is mounted in each counterbore. Each ring has an inside diameter less than that of the bore. A cylindrical optical mixing device extends axially in the bore and has an outside diameter equal to the inside diameter of the rings. The ends of the mixing device are mounted in the rings. The connector comprises a hollow cylindrical body terminated at one end by a coupling flange and end piece. The end piece has an opening therein. A ring mounted in said opening has an inside diameter equal to that of the end ring of the mixer support. A fiber optic bundle is mounted in the connector. Means positions the fibers of the bundle in an annular array inside the bore of the connector ring. Said means comprises a cylindrical core secured to the inside of the annular array of fibers. Means is provided for aligning the center axes of the mixing device and the connector. The aligning means is located between the outer faces of the coupling flanges of the mixing device and the connector. The aligning means has a length such that the end piece faces of the mixing device and the connector can be brought very close together. There is provided detachable means for holding together the coupling flanges of the connector and mixing device and the aligning means to achieve alignment of the mixing device and the fiber bundle.

DESCRIPTION OF THE PREFERRED EMBODIMENTS

Figure 1:
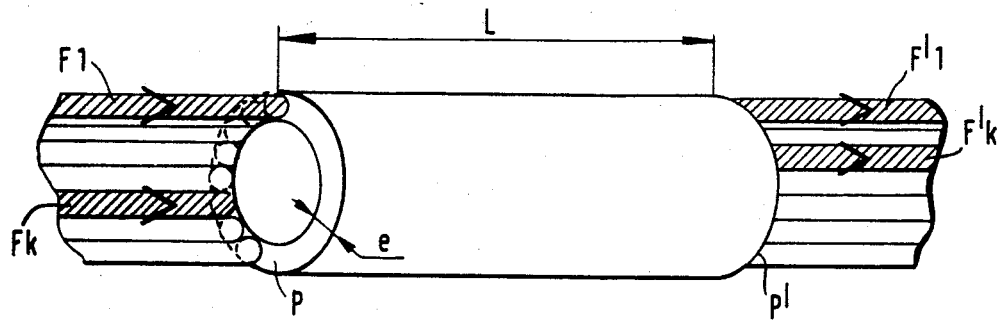
FIG. 1 represents a mixing device of the type used in the present invention.

The mixer shown in FIG. 1 comprises a cylindrical tube of a length L and thickness e, terminating in two plane faces P and P' perpendicular to the axis. The tube is made of a transparent material, such as glass, having a refractive index n1. The inner and outer walls of the tube are in contact with a medium having a refractive index n2, lower than index n1. The end faces P and P' are placed in contact with optical fibers arranged in an annular array. If the length L of the mixer is sufficient, light energy received at face P through a fiber F1 is distributed uniformly over face P' and therefore between all the fibers F'k. Conversely, a fiber F'l receives through the mixer an almost equal fraction of the light energy transmitted by all the fibers Fk.

Figure 2:
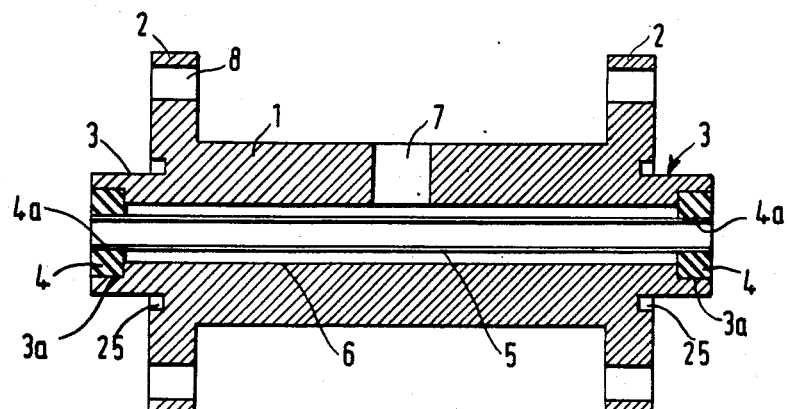
FIG. 2 shows a cross-sectional view of a mixer support according to the invention.

A support for such a mixer is shown in FIG. 2. It consists of a body 1 provided at each end with a coupling flange 2 and a cylindrical end piece 3. An axial bore 6 crosses through the support longitudinally and its diameter is greater than the diameter of the mixing device. Recesses 3a are provided in the ends of the end pieces 3 for the insertion of the mixer guide rings 4. Each ring 4 is preferably a watch bearing jewel. The hole 4a in the jewel is bored to the dimension of the outside diameter of the mixer by any known method. Attachment holes 8 are drilled in the flanges 2. The mixer is held in place by cementing one of its ends to the inner wall of a jewel. If the mixer does not have an optical sheathing, it is best to coat its outer wall with a reflecting film (not shown) to prevent light losses on contact with the cement or the jewel. A radial hole 7 is drilled in body 1 to allow a synthetic resin (not shown) to be poured into the free space existing between the mixer 5 and the body 1 and serving to lock the mixer in place. If the mixer does not have an optical sheathing, a transparent synthetic resin should be used having a refractive index n3 low enough to allow it to serve as an optical sheathing. The numerical aperture NA of the mixer can then be written $NA = \sqrt{n_1^2 - n_3^2}$. In order to have no light loss, this numerical aperture must be greater than that of the optical fibers in contact with the end faces of the mixer. The mixer support will be preferably made of a material having an expansion factor as close as possible to that of the mixer glass. After the mixer is cemented, its ends are cut off and the faces of the end pieces 3 are ground to an exact dimension and polished.

Figure 3:
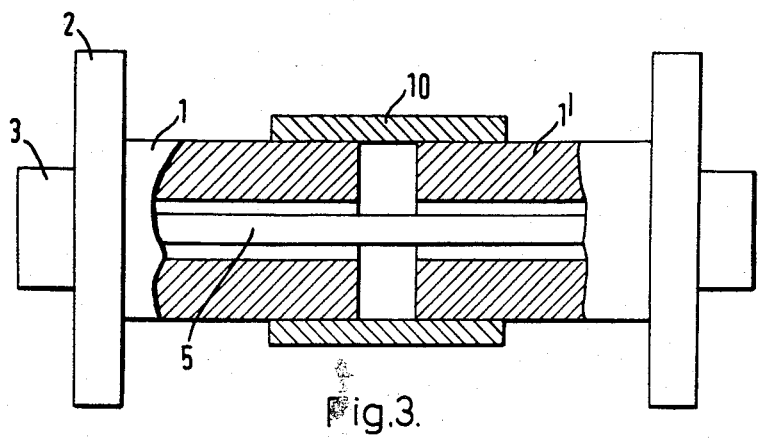
FIG. 3 shows a variant of the mixer support shown in FIG. 2.

FIG. 3 shows a variant of the support in FIG. 2. The body 1 of the support is divided into two parts 1 and 1' in order that the length of the support can be matched to the length of the mixer. Once the mixer 5 is in place, the two parts of the mixer support 1 and 1' are fastened together by means of a sleeve 10. The assembly is held together by means of an "epoxy" type or cyanocrylic cement.

Figure 4:
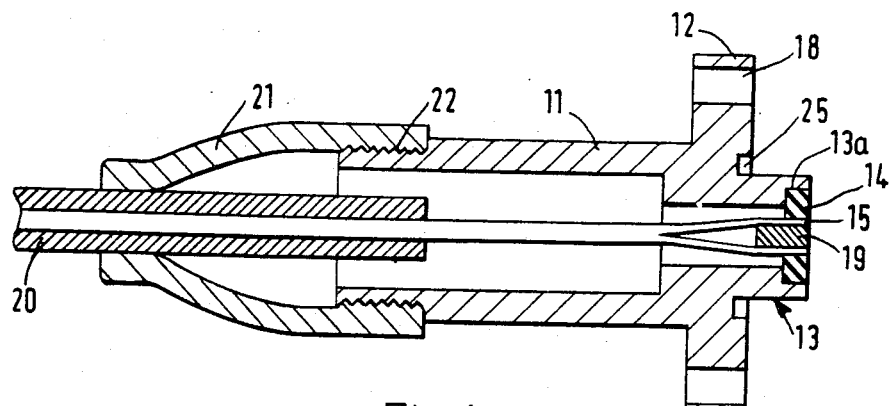
FIG. 4 shows a cross-sectional view of a connector according to the invention.

FIG. 4 shows a cross-sectional view of a connector in accordance with the invention and suitable for the coupling of a fiber optic bundle to a mixer. The connector consists of a body 11, a coupling flange 12 and a cylindrical end piece 13. As in the case of the support shown in FIG. 2, a guide ring 14 is set in a recess 13a provided for this purpose in the end of the end piece 13. The guide ring 14 (or jewel) is bored to the same diameter and with the same precision as in the case of the mixer support. The optical fiber bundle cable 20 is held in place by cementing to a sleeve 21, for example of a thermosetting material. The sleeve 21 can be fixed to the body 11 also by cementing it to a knurled section 22 located at the end of the body 11. The optical fibers of the cable are arranged in an annular array 15 of one or more layers and cemented to the inner wall of the jewel 14. They are held in place by a cylindrical, tapered core 19 while the core-fiber assembly is cemented firmly. As in the case of the support in FIG. 2, the end face of the connector is ground to the desired dimension and polished. This end face must be parallel to the front face of the flange 12. Attachment holes 18 are drilled in the flange 12.

Figure 5:
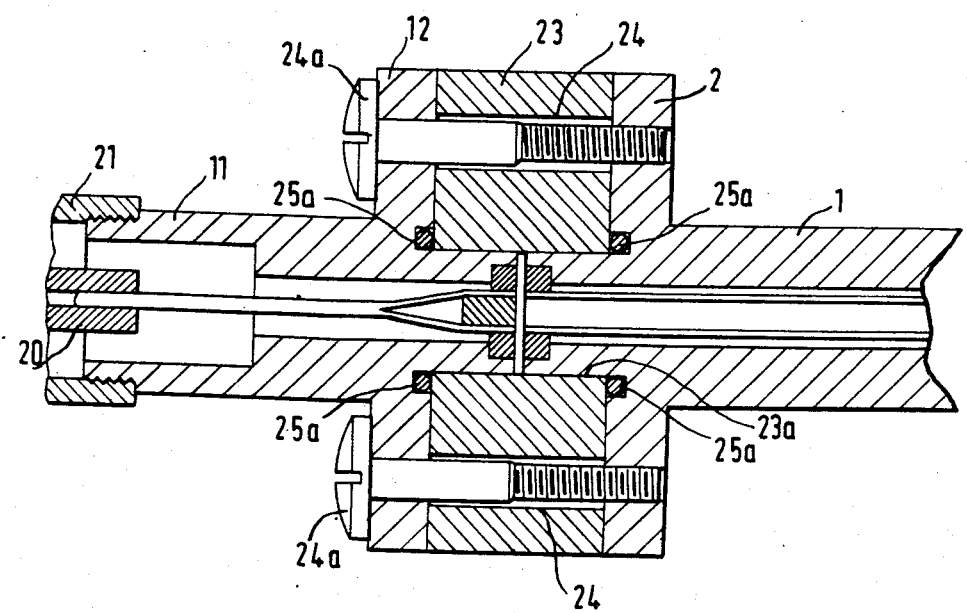
FIG. 5 shows a cross-sectional view of the mixer support in FIG. 2 joined to the connector in FIG. 4.

FIG. 5 shows a cross-sectional view of the connector in FIG. 4 and the support in FIG. 2 when they are assembled together. The connector and support are positioned and aligned axially by means of a spacer 23 in which a hole 23a has been bored of the same diameter as the outside diameter of the connector and support end pieces. Holes 24 are provided in the spacer 23 for the installation of screws 24a which hold the connector-spacer-support assembly together. Annular grooves 25 are provided on the support and on the connector, respectively, for the installation of O-rings 25a which seal the assembly.

Figure 6:
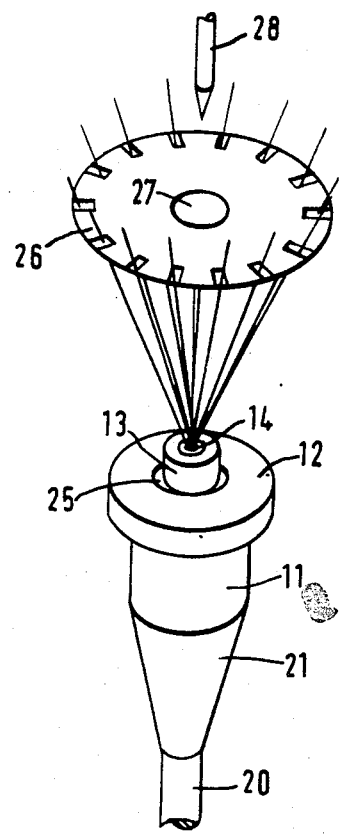
FIG. 6 illustrates a method of installing fibers in the connector.
Figure 7A:
FIGS. 7a and 7b show two alternative core configurations used for the placement of fibers in the connector.
Figure 7B:

FIG. 6 illustrates a method for positioning fibers in the bore of the connector jewel. A notched disk 26 holds the fibers projecting from the connector in position. The core 28, of drawn glass for example, is lowered through a center hole 27 drilled in the disk 26 in the free space in the middle of the fibers. If a single layer of fibers is sufficient, the fibers will be properly positioned by rotating the core back and forth as it is lowered into place. The core is then pushed in until it bottoms and is cemented in place with the fibers. The fibers and core projecting outward past the connector end piece 13 are then severed and the front face of the end piece is ground and polished as previously indicated. If several layers of fibers are required, it is preferable to use a core 28a such as the one whose cross-section is shown in FIG. 7b. It differs from the core 28 previously used, whose cross-section is shown in FIG. 7a, in that it is designed with ribs which serve to divide the bundle of fibers into equal fractions. The fibers are then positioned in the same way as before.

What is claimed is:

1. A detachable connecting device for coupling a fiber optic bundle and an optical mixing device comprising:

a support comprising a cylindrical body with a coupling flange and end piece at each end thereof, an axial bore extending to the ends of said body, a counterbore at each of said ends, a ring mounted in each counterbore, said ring having an inside diameter less than that of said bore;

a cylindrical optical mixing device extending axially in said bore and having an outside diameter equal to said inside diameter of said rings, the ends of said mixing device being mounted in said rings;

a connector comprising a hollow cylindrical body terminated at one end by a coupling flange and end piece, said end piece having an opening therein, a ring mounted in said opening and having an inside diameter equal to that of said end ring of said support, a fiber optic bundle mounted in said connector, means positioning the fibers of said bundle in an annular array inside the bore of said connector ring, said means comprising a cylindrical core secured to the inside of said annular array of fibers;

means for aligning center axes of said mixing device and said connector, said aligning means being located between the outer faces of the coupling flanges of said mixing device and said connector, said aligning means having a length such that the end piece faces of said mixing device and said connector can be brought very close together; and detachable means for holding together the coupling flanges of said connector and mixing device and said aligning means.

2. A connecting device as set forth in claim 1 including:

a hole in said body of the said support extending from the outside wall to the internal bore of the said body.

3. A connecting device as set forth in claim 1 wherein:

said body of said support is divided into two adjustable parts slidable in a sleeve.

4. A connecting device as set forth in claim 1 wherein:

said rings mounted in said support and said connector are watch bearing jewels.

5. A connecting device as set forth in claim 1 wherein:

said aligning means comprises a spacer having a bore whose diameter is equal to the outside diameter of the end pieces of said support and said connector.

* * * * *